(12) United States Patent
Yan

(10) Patent No.: US 7,582,829 B2
(45) Date of Patent: Sep. 1, 2009

(54) ELECTRICAL JUNCTION BOX WITH A BUILT-IN FITTING INSERT

(76) Inventor: Frank Shaochong Yan, 5 Windwood, Irvine, CA (US) 92604

( * ) Notice: Subject to any disclaimer, the term of this patent is extended or adjusted under 35 U.S.C. 154(b) by 0 days.

(21) Appl. No.: 11/967,239

(22) Filed: Dec. 30, 2007

(65) Prior Publication Data

US 2008/0156510 A1 Jul. 3, 2008

Related U.S. Application Data

(60) Provisional application No. 60/883,325, filed on Jan. 3, 2007.

(51) Int. Cl.
*H02G 3/08* (2006.01)
*H02G 3/18* (2006.01)

(52) U.S. Cl. .................. 174/50; 174/659; 174/660; 174/60; 220/3.2; 220/4.02; 248/49

(58) Field of Classification Search .............. 174/480, 174/481, 50, 53, 57, 58, 562, 560, 559, 59, 174/60, 64, 650, 652, 657, 659, 666, 72 A, 174/663, 135, 660; 220/3.2–3.9, 4.02; 439/535–539, 439/949; 248/906, 49, 65
See application file for complete search history.

(56) References Cited

U.S. PATENT DOCUMENTS

| | | | | | |
|---|---|---|---|---|---|
| 2,659,765 | A | * | 11/1953 | Dunn | 220/3.2 |
| 3,084,958 | A | * | 4/1963 | Appleton | 220/3.2 |
| 4,316,999 | A | * | 2/1982 | Nattel | 220/3.2 |
| 5,013,872 | A | * | 5/1991 | Lockwood et al. | 174/663 |
| 5,216,203 | A | * | 6/1993 | Gower | 174/663 |
| 5,579,938 | A | * | 12/1996 | Bourassa et al. | 220/3.2 |
| 5,932,844 | A | * | 8/1999 | MacAller et al. | 174/652 |
| 6,064,009 | A | * | 5/2000 | Jorgensen et al. | 174/135 |
| 6,100,470 | A | * | 8/2000 | Gretz | 174/59 |
| 6,232,553 | B1 | * | 5/2001 | Regen | 174/64 |
| 6,979,779 | B2 | * | 12/2005 | Grady | 174/50 |

* cited by examiner

*Primary Examiner*—Angel R Estrada
(74) *Attorney, Agent, or Firm*—Michael C. Olson

(57) ABSTRACT

This invention relates to an Electrical Junction Box with an external Built-in Fitting and clamp for securing armored metal cable to the Electrical Junction Box. The Built-in Fitting is extruded from a side wall of the Electrical Junction Box and has at least one pry-out for receiving an armored metal cable. A clamp is attached to the Built-in Fitting with threaded fasteners. As the threaded fasteners are tightened, the armored metal cable is clamped in the opening of the side wall of the Built-in Fitting.

4 Claims, 5 Drawing Sheets

ELECTRICAL JUNCTION BOX WITH A BUILT-IN FITTING INSERT

BACKGROUND OF THE INVENTION

Typically, in construction of commercial, industrial and some residential space, building codes require the use of armored metal cable, for holding electrical wires, which terminate at an Electrical Junction Box. The armored metal cable is affixed to the interior of the Electrical Junction Box by a removable clamp, nut or other connector which is installed in the interior of the box. A variety of electrical switches and receptacles can be mounted inside the Electrical Junction Box. Often, when shipped to the job site, the Electrical Junction Box already has an electrical switch or receptacle mounted onto the box. A laborer, in installing the armored metal cable, must first remove the switch or receptacle, remove a pry-out from the Electrical Junction Box, run the armored metal cable through the pry-out into the interior of the Electrical Junction Box, install the clamp to hold the armored metal cable in place and then reinstall the switch or receptacle. Later, an electrician will remove the switch or receptacle, connect the wiring to the switch or receptacle, and reinstall the switch or receptacle.

A problem with the current design of Electrical Junction Boxes is that the installation involves needless steps. The worker must remove the switch or receptacle to attach the armored metal cable to the interior of the junction box. Then he must reinstall the switch or receptacle until the electrician later arrives to connect the wiring. The electrician must remove the switch or receptacle, connect the wiring and then reinstall the switch or receptacle. This wastes time and money. Another problem with the current design is that if the armored metal cable is not properly seated in the Electrical Junction Box, the electrical ground might be inadequate. Also, the armored metal cable will not be securely held in place if the clamp is not properly seated. Another problem encountered with Electrical Junction Boxes as presently configured is that the Electrical Junction Boxes are commonly used with Extension Rings (mud-rings) mounted prior to installation of the armored metal cable, which can make fastening of the clamp awkward or difficult. An additional problem associated with presently configured Electrical Junction Boxes is that the clamps used to hold the armored metal cable in place are located in the interior of the Electrical Junction Box, thus decreasing the volume of the cavity of the Electrical Junction Box. This invention involves an Electrical Junction Box with a built-in fitting that allows for a secure grounding path, while firmly holding the armored metal cable in place. Further, the built-in fitting is external to the Electrical Junction Box which allows for quicker installation since the switch or receptacle need not be removed for installation. It also allows for adjustment of the clamp after installation of extension rings, switches or receptacles.

DETAILED DESCRIPTION OF THE INVENTION

Figure 1:
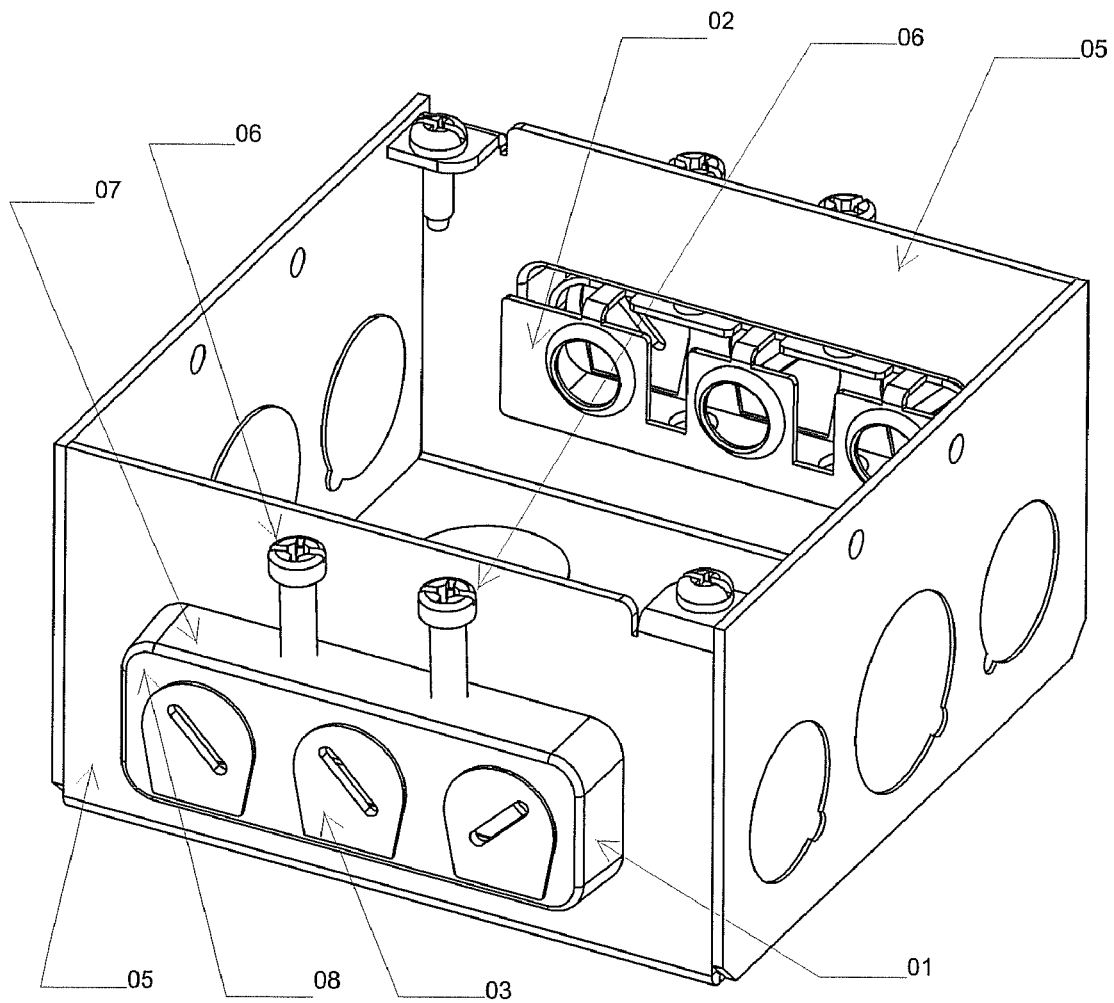
FIG. 1 contains a parametric view of the Electrical Junction Box with Built-in Fitting Insert according to the present invention.
Figure 2:
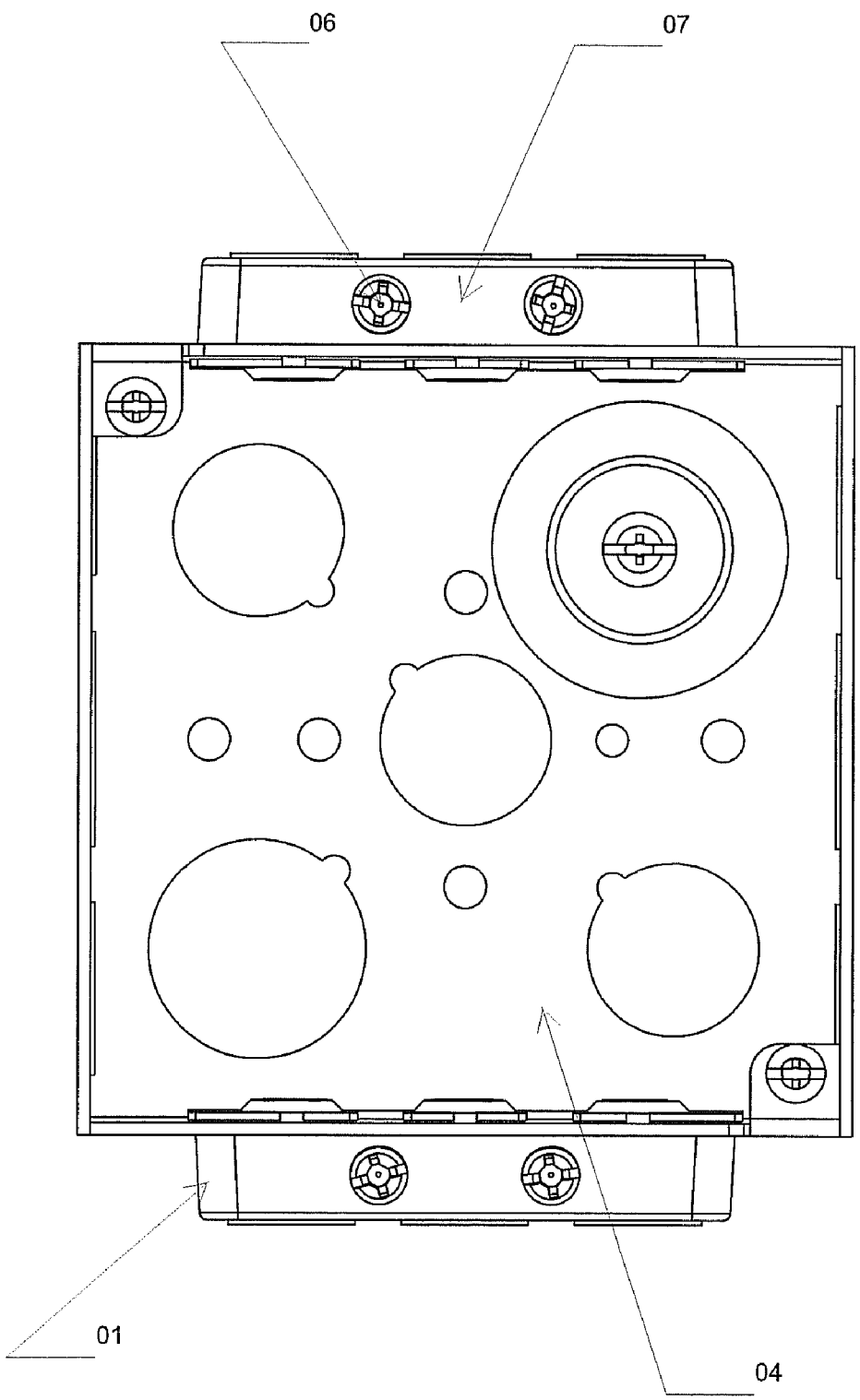
FIG. 2 contains top view of the Electrical Junction Box with Built-in Fitting Insert according to the present invention.

This invention relates to an Electrical Junction Box with a Built-in Fitting and clamp external to the Electrical Junction Box, that allows for a secure grounding path while firmly holding an armored metal cable in position. Electrical Junction Boxes come in a variety of different shapes, but are typically rectangular in shape. The Electrical Junction Box typically has a cavity formed by side walls (05) and a back wall (04). The cavity holds wiring, switches or receptacles. The Electrical Junction Box will contain a number of pry-outs (03) in the side walls or back wall. Electrical power is run to the Electrical Junction Box via wires contained in armored metal cable. The armored metal cable is connected to the Electrical Junction Box at the pry-out. In the preferred embodiment, the Electrical Junction Box is constructed with an extruded Built-in Fitting (01). The Built-in Fitting has a plurality of side walls (07) and a back wall (08), and is generally a rectangular shaped body, external to the Electrical Junction Box. The Built-in Fitting has at least one pry-out (03) and a clamp (02) for securing the armored metal cable to the Electrical Junction Box. In the preferred embodiment, the Built-in Fitting is extruded from a sidewall of the Electrical Junction box. As an alternative embodiment, the Built-in Fitting can be constructed independently of the Electrical Junction Box and fixedly attached to the Electrical Junction Box. The clamp is constructed of the same material as the Built-in Fitting. The clamp may include a variety of tabs, protrusions or attached bodies for a variety of purposes. The Built-in Fitting has two threaded openings in a sidewall for attachment of the clamp. Threaded fasteners (06) are used to attach the clamp to the Built-in Fitting. As the screws are tightened at the job site by the installer, the clamp is forced down and the clamp secured the armored metal cable in the pry-out (03). The Electrical Junction Box can be manufactured with one or more Built-in Fittings.

An object of the invention is to provide for a secure ground between the Electrical Junction Box and the metal armor of the armored metal cable. A second object of the invention is to provide an Electrical Junction Box which can firmly hold the armored metal cable in place without the use of an internal clamp or fastener, thereby increasing the carrying capacity of the Electrical Junction Box. A third object of the invention is to create an Electrical Junction Box with easier access, after installation of an extension ring, switch or receptacle, to the means used to secure the armored metal cable to the Electrical Junction Box.

Figure 3:
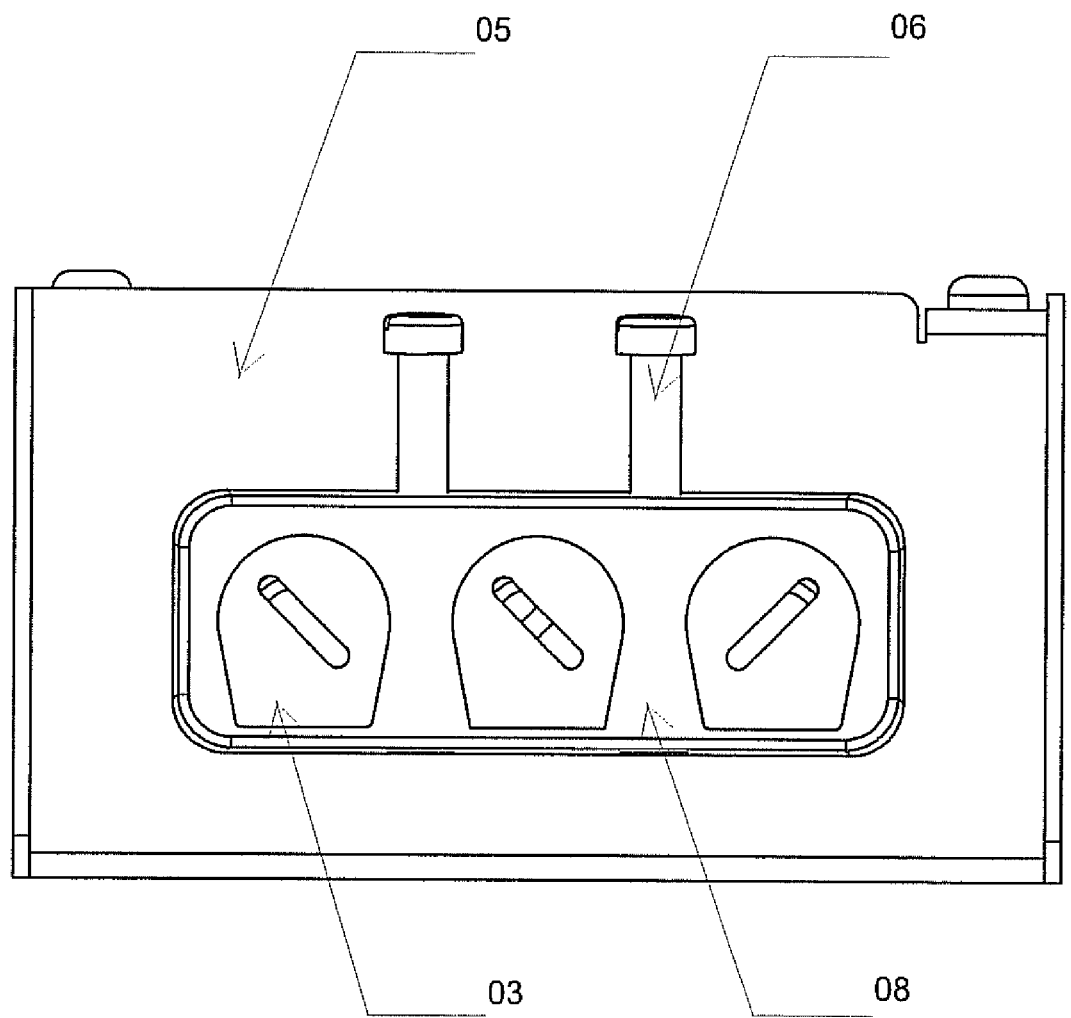
FIG. 3 contains a side view of the Electrical Junction Box hiding one side wall and with the Built-in Fitting Insert according to the present invention.
Figure 4:
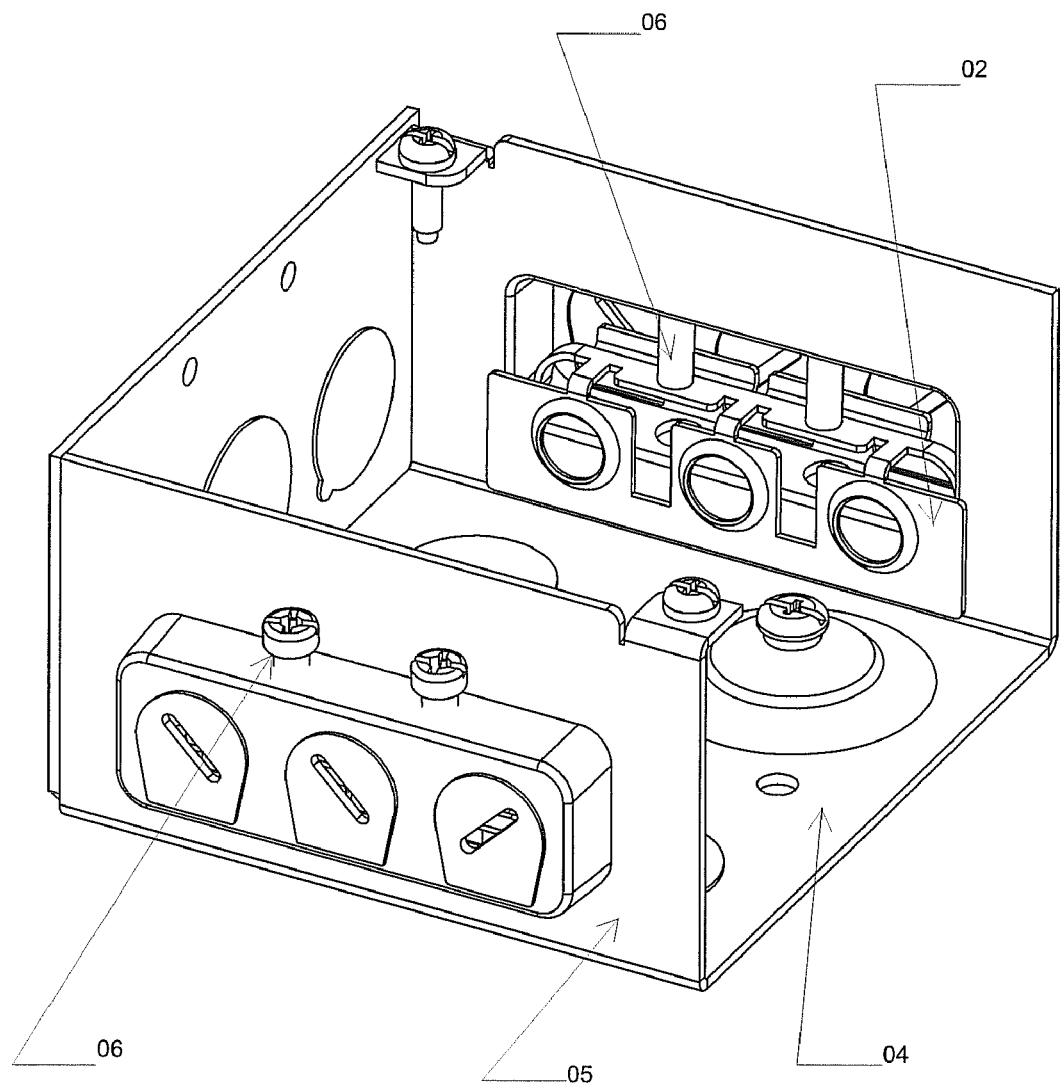
FIG. 4 contains a parametric view of the Electrical Junction Box with Built-in Fitting Insert according to the present invention.

The first objective is accomplished through the use of an Electrical Junction Box with an extruded Built-in Fitting as depicted in FIG. 1. The Built-in Fitting has one or more pry-outs for receiving the armored metal cable as depicted in FIG. 3. The armored metal cable enters the Built-in Fitting through the pry-out (03), where it is held in place by the clamping effect of the clamp on the armored metal cable as it passes through the pry-out. Because the Built-in Fitting is extruded from a sidewall of the Electrical Junction Box, there will be a continuous ground between the Built-in Fitting and the Electrical Junction Box.

Figure 5:
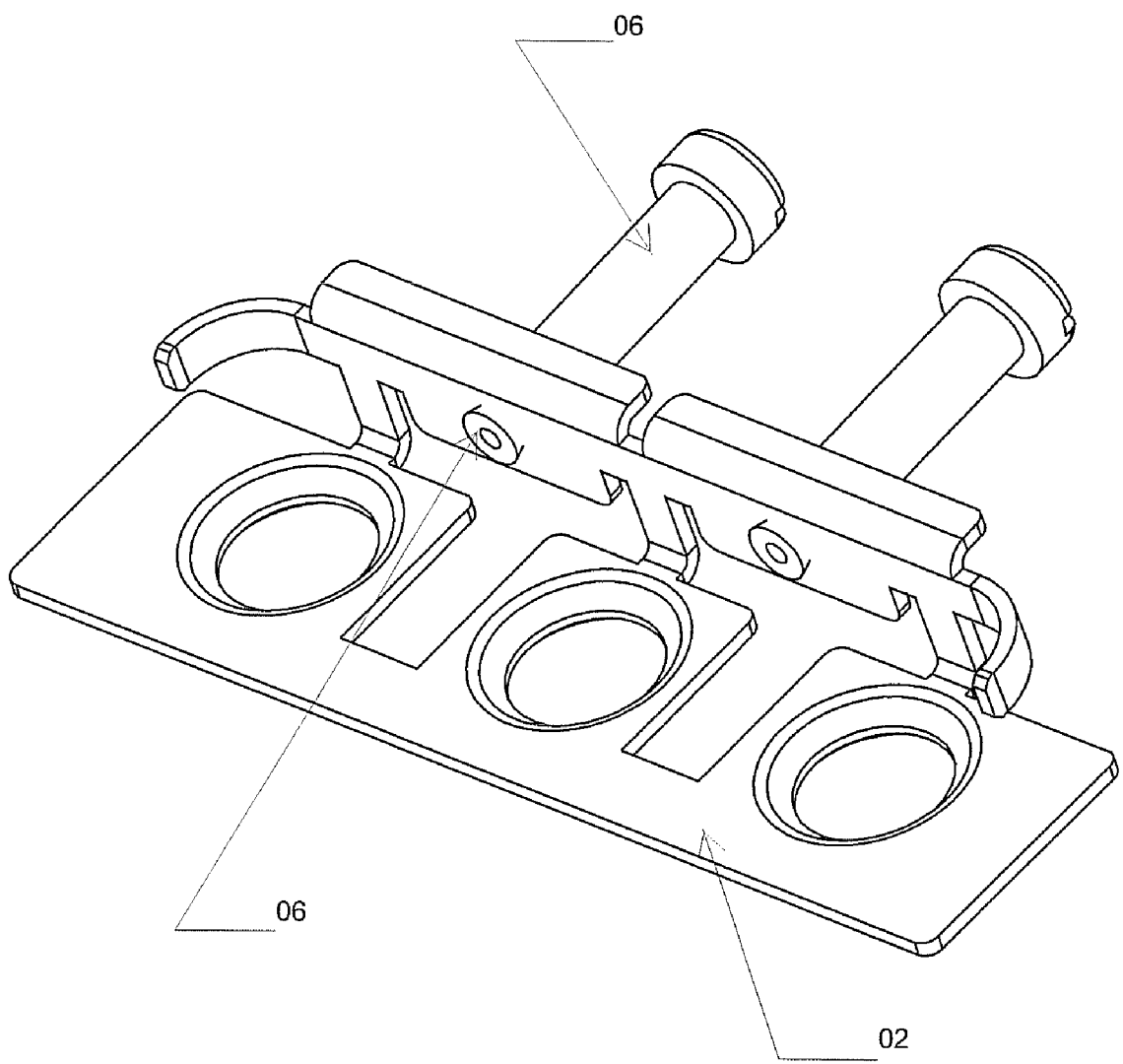
FIG. 5 contains a parametric view of the clamp forming a part of the Electrical Junction Box for the Built-in Fitting Insert according to the present invention.

The second objective is accomplished through the use of the external Built-in Fitting with an adjustable level clamp as depicted in FIG. 1. The armored metal cable enters the Built-in Fitting through the pry-out hole, where it is held in place by the clamp as depicted in FIG. 5. Because the clamp is external to the Electrical Junction Box and secured inside the Built-in Fitting, space in the cavity of the Electrical Junction Box is not occupied by a clamp or other fastener used to secure the armored metal cable to the Electrical Junction Box.

The third objective is accomplished through the use of an external Built-in Fitting and threaded fasteners as depicted in FIG. 1. After extension rings, switches or receptacles are installed on the Electrical Junction Box, it can be difficult to adjust the clamps holding the armored metal cable in place in the Electrical Junction Box. Placement of the built-in fitting and threaded fasteners externally to the Electrical Junction Box allows for easier installation and removal of armored metal cable without removal of the Extension Ring.

I claim:

1. An Electrical Junction Box with a Built-in Fitting Insert comprising:
    an electrical junction box having a plurality of side walls and at least one back wall forming a body;
    a Built-in Fitting extruded from a side wall of the electrical junction box, having a back wall and a plurality of side walls forming a body, with at least one of said side walls having a plurality of threaded openings;
    at least one pry-out in the back wall of said Built-in Fitting for receiving a wire containing armored metal cable;
    a clamp comprising a body having at least one opening for receiving the wire contained in an armored metal cable, said body containing a plurality of threaded openings;
    means for adjustably securing said clamp to said Built-in Fitting Insert.

2. The Electrical Junction Box with Built-in Fitting Insert of claim 1 wherein the means for securing said clamp to said Built-in Fitting is a threaded fastener.

3. An Electrical Junction Box with a Built-in Fitting Insert comprising:
    an electrical junction box having a plurality of side walls and at least one back wall forming a body;
    a Built-in Fitting having a back wall and a plurality of side walls forming a body, with at least one of said side walls having a plurality of threaded openings, said Built-in Fitting being fixedly attached to a side wall of said electrical junction box;
    at least one pry-out in the back wall of said Built-in Fitting for receiving a wire containing armored metal cable;
    a clamp comprising a body having at least one opening for receiving the wire contained in an armored metal cable, said body containing a plurality of threaded openings;
    means for adjustably securing said clamp to said Built-in Fitting Insert.

4. The Electrical Junction Box with Built-in Fitting Insert of claim 3 wherein the means for securing said clamp to said Built-in Fitting is a threaded fastener.

\* \* \* \* \*